United States Patent Office 3,350,413
Patented Oct. 31, 1967

3,350,413
ACIDIC LIPID ANHYDRIDES
James Bruce Martin, Hamilton, Ohio, assignor to The Procter & Gamble Company, Cincinnati, Ohio, a corporation of Ohio
No Drawing. Filed Nov. 4, 1963, Ser. No. 321,292
7 Claims. (Cl. 260—346.8)

This invention relates to new orgnaic compounds and, more particularly, to new edible acidic lipid anhydrides having utility as additives for bakery products such as bread, cakes, pies, doughnuts, icings, fillings, and the like products prepared from emulsions comprising water, fat, protein and/or carbohydrates.

The volume, texture, and eating qualities of many bakery products are dependent upon the interaction of various ingredients during the mixing operation in which a dough, batter, or other emulsion is formed and the stabilization during subsequent baking and/or storage of said bakery product. Many attempts have been made to improve the emulsion characteristics of bakery products by incorporating therein small amounts of various edible additives which are able to affect the colloidal properties of the proteinaceous, amylaceous, or oleaginous bakery constituents. Although a number of the conventional additives such as lecithin and the partial glycerides of higher fatty acids have been found to be useful emulsifiers in bakery products, these emulsifiers have not provided the desired foam stability in association with the air incorporation produced during preparation of doughs, batters, and other bakery emulsions.

It is therefore, a primary object of this invention to provide a new group of edible organic compounds which provide superior foam stability in association with the air incorporation produced during preparation of doughs, batters, and other bakery emulsions.

The above and related objects are accomplished by means of a group of new compounds having the general formula

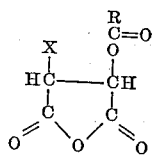

wherein X is selected from the group consisting of —H and

and R is selected from the group consisting of alkyl and alkenyl radicals having from 11 to 21 carbon atoms.

Included within the class of compounds having the above general formula are the cyclic anhydrides of acidic lipids selected from the group consisting of the condensation products of fatty acid containing from about 12 to about 22 carbon atoms with a hydroxy-dicarboxylic acid containing 4 carbon atoms and having from 1 to 2 hydroxyl groups.

EXAMPLE A

Specific examples of suitable fatty acids for use in forming the acidic lipid anhydrides of this invention are lauric, myristic, myristoleic, palmitic, palmitoleic, stearic, oleic, linoleic, linolenic, arachidic, gadoleic, arachidonic, behenic, and erucic acids.

EXAMPLE B

Specific examples of suitable hydroxy-dicarboxylic acids for use in forming the acidic liqid anhydrides of this invention are malic acid and tartaric acid.

EXAMPLE C

Specific examples of the acidic lipid anhydrides of this invention are malic oleate anhydride, malic palmitate anhydride, tartaric dibehenate anhydride, and tartaric palmitate stearate anhydride.

Preparatory to the formation of the acidic lipid anhydrides of this invention it is preferable to form intermediate acidic lipids of the above fatty acids and hydroxy-dicarboxylic acids. This can be conveniently accomplished by acylating the hydroxy dicarboxylic acid with a fatty acid chloride in appropriate solvents such as pyridine, quinoline, dioxane, dimethylformamide, dimethylacetamide, and mixtures thereof, either with or without addition of lipid solvents such as chloroform, benzene, and ethyl ether. These reactions can be carried out over a wide temperature range of from 0° C. to about 150° C. or higher as long as undesirable side reactions are avoided. Upon completion of the acylation reaction, the desired condensation products are isolated by dilution with an aqueous phase followed by washing, and/or distillation, and/or crystallization when required to remove solvents, excess reactants, and impurities. The method described in U.S. Patent 2,251,695, granted to Tucker, Aug. 5, 1941, is an effective example of such a procedure.

The most effective method for the formation of the new acidic lipid anhydrides of this invention employs metathesis of the above-mentioned intermediate acidic lipids with acetic anhydride at low temperatures, i.e., 0° to 60° C. with perchloric acid catalysis.

Although specific methods of preparing the aforesaid acidic lipid anhydrides are described herein, it is not intended that the invention should be limited to particular methods of preparation of these compounds.

The acidic lipid anhydrides of this invention have been found to markedly enhance cake volume, texture, and grain and materially improve batter stabilization. The most beneficial and dramatic effect of the acidic lipid anhydrides is their ability to stabilize foams during baking and the consequent formation of very good cake texture and grain, such use being described in the co-pending application of Martin and Howard, U.S. Ser. No. 247,860, filed Dec. 28, 1962, now Patent No. 3,168,405. Although many of the acidic lipids from which the anhydrides can be derived are capable of facilitating the incorporation of air in cake batters, they do not have the characteristic stabilizing properties of the acidic lipid anhydrides. The acidic lipids also tend to form a coarse open-grained texture in contradistinction to the very fine grain produced by the anhydride. Because of these deficiencies of the acidic lipids, their successful use in batter systems generally depends upon the addition of other materials which are usually unnecessary in the case of the acidic lipid anhydrides of this invention.

Although it is not desired to be bound by theory, it is believed that the non-ionic nature of the acidic lipid anhydrides, as distinguished from the ionic nature of the acidic lipids, enables the formation of a covalent bond with batter ingredients, such as protein, which leads to the effective stabilization of the batter. The acidic lipid anhydrides of this invention do not ionize in batter systems as do the acidic lipids.

Again, though it is not desired to be bound by theory, it is believed that the solid state crystal structure of the acidic lipid anhydrides may have an important bearing on their functionality in batter systems in a unique manner not manifested by the acidic lipids.

The following examples further illustrate the new organic compounds of this invention, but the invention is not limited to these specific examples.

EXAMPLE 1

Twenty grams (0.05 mole) of malic stearate was added to 10 ml. (0.11 mole) of acetic anhydride, 100 ml. of toluene, and 0.01 ml. of 70% perchloric acid. The mixture was stirred at room temperature. Dissolution of the malic stearate took place readily and precipitation of the malic stearate anhydride began quickly. The mixture was diluted with 250 ml. hexane and stirred for 15 minutes with cooling in an ice bath. The catalyst was inactivated by addition of 1 ml. of a slurry of sodium methoxide in xylene (0.09 g. sodium methoxide per ml.). The precipitate was collected by filtration and redissolved in 250 ml. hexane with warming. On cooling the solution to room temperature, filtering, and vacuum drying, a yield of 14.5 g. (76%) of malic stearate anhydride was obtained.

The anhydride product was found by analysis to have the following characteristics:

| | | |
|---|---|---|
| Complete melting point | °C | 70.7 |
| Saponification Value (S.V.) | | 415 |
| Carbon | pct | 68.2 |
| Hydrogen | pct | 9.6 |

The calculated analytical values were: S.V.=441; percent C=69.1; percent H=9.9. The anhydride structure of this material was confirmed by infrared spectral analysis.

EXAMPLE 2

Sixty-eight grams (0.1 mole) tartaric distearate, 300 ml. (3.2 moles) acetic anhydride, and 1 ml. of 70% perchloric acid were mixed and stirred at room temperature for 15 minutes. Then 20 ml. of sodium methoxide in xylene (0.09 g. sodium methoxide per ml.) was added to the reaction mixture and stirring was continued for an additional 15 minutes. The reaction product was extracted first with 1 liter of petroleum ether (Skelly F), then filtered, and then the residue was extracted with 1 liter of benzene. The petroleum ether and benzene extracts yielded, respectively, 7.6 grams (at 0° F.) and 26.7 grams (at 50° F.) of product upon crystallization and filtration.

The anhydride product (26.7 g.) obtained from the benzene fraction was found by analysis to have the following characteristics:

| | | |
|---|---|---|
| Complete melting point | °C | 93.3 |
| Minimum melting point | °C | 52.7 |
| Saponification Value (S.V.) | | 309 |
| Carbon | pct | 70.9 |
| Hydrogen | pct | 10.8 |

The calculated analytical values were: S.V.=329 percent, C=72.2 percent, H=11.1. The anhydride structure of the product obtained from the benzene fraction was confirmed by infrared spectral analysis.

When tartaric dibehenate or tartaric palmitate stearate is substituted in an equivalent amount for tartaric distearate in the above example, tartaric dibehenate anhydride and tartaric palmitate stearate anhydride are prepared respectively.

What is claimed is:

1. A compound of the formula:

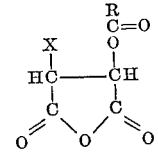

wherein X is selected from the group consisting of —H and

and R is selected from the group consisting of alkyl and alkenyl radicals having from 11 to 21 carbon atoms.

2. A compound according to claim 1 wherein X is —H.
3. Malic stearate anhydride.
4. Malic palmitate anhydride.
5. A compound according to claim 1 wherein X is

6. Tartaric distearate anhydride.
7. Tartaric dibehenate anhydride.

References Cited

UNITED STATES PATENTS

| | | | |
|---|---|---|---|
| 2,251,695 | 8/1941 | Tucker | 260—476 |
| 3,168,405 | 2/1965 | Martin | 99—91 |

HENRY R. JILES, *Primary Examiner.*

R. BOYD, *Assistant Examiner.*